United States Patent [19]

Sumida

[11] Patent Number: 4,912,703
[45] Date of Patent: Mar. 27, 1990

[54] APPARATUS AND METHOD FOR DATA FLOW CONTROL IN BROADCAST DATA TRANSMISSION SYSTEM

[75] Inventor: Yuji Sumida, Tokyo, Japan

[73] Assignee: Kabushiki Kaisha Toshiba, Kawasaki, Japan

[21] Appl. No.: 250,581

[22] Filed: Sep. 29, 1988

[30] Foreign Application Priority Data

Sep. 30, 1987 [JP] Japan ................. 62-246077

[51] Int. Cl.[4] ............................... H04J 3/26
[52] U.S. Cl. .................. 370/58.2; 370/95.1
[58] Field of Search ............. 370/85, 89, 94, 80, 370/93; 340/825.5, 825.51, 825.52

[56] References Cited

U.S. PATENT DOCUMENTS

| 4,677,616 | 6/1987 | Franklin | 370/85 |
| 4,727,537 | 2/1988 | Nichols | 370/94 |
| 4,771,391 | 9/1988 | Blasbalg | 370/85 |
| 4,787,082 | 11/1982 | Delaney et al. | 370/85 |
| 4,792,941 | 12/1988 | Yanosky, Jr. et al. | 370/85 |
| 4,799,215 | 1/1989 | Suzuki | 370/94 |

FOREIGN PATENT DOCUMENTS 61-5645 1/1986 Japan.

Primary Examiner—Douglas W. Olms
Assistant Examiner—Alpus H. Hsu
Attorney, Agent, or Firm—Finnegan, Henderson, Farabow, Garrett and Dunner

[57] ABSTRACT

A broadcast data transmission station for use in a data transmission system. The station includes a traffic amount counter for computing the amount of broadcast data present on a transmission line during a unit time period. A comparator indicates whether the traffic amount computed by the traffic amount counter has reached a predetermined limit. If the limit has not been reached, a transmission execution circuit allows the broadcast data to be sent on the transmission line. If the limit has been reached, a retransmission attempt circuit and delay timer cause the station to wait a delay time and then compare the traffic amount with the limit again. A retransmission attempt counter computes the number of attempts to send the same broadcast data, and a suspension circuit suspends further attempts to send the same broadcast data when the number of attempts counted by the retransmission attempt counter reaches another predetermined limit.

6 Claims, 5 Drawing Sheets

APPARATUS AND METHOD FOR DATA FLOW CONTROL IN BROADCAST DATA TRANSMISSION SYSTEM

BACKGROUND OF THE INVENTION

This invention relates to a broadcast data transmission system, and more particularly to a broadcast data transmission system providing for data flow control.

Various modes of data transmission systems have been employed for local area networks (LANs). One of these is the broadcast data transmission system. As shown in FIG. 1, a LAN has a number of stations 11 that are connected by a transmission line 12. Data to be transmitted from an internal buffer 13 of one station 11 is sent on transmission line 12 as broadcast data. Each station 11 in the LAN then receives the broadcast data and processes it, storing the boardcast data in its own internal buffer 13.

Items of broadcast data are transmitted and received by stations 11 in the format of transmission frames. In broadcast data transmission systems, transmission frames do not include destination address information for the broadcast data. Therefore, the station that transmitted a broadcast data item also receives the transmission frame containing that item of boardcast data.

In this way, broadcast data can be transmitted to all stations 11 in the LAN at once in a broadcast data transmission system. Compared with systems in which data must be transmitted separately to each station, data transmission efficiency is greatly increased in the broadcast data transmission system.

Unfortunately, there are problems associated with the use of broadcast data transmission systems. FIG. 2 shows the amount of traffic on transmission line 12 at certain times t. The traffic amount number Nt corresponds to the number of items of broadcast data present on the transmission line during a unit time period (having a duration of 1.0 second in the example shown in FIG. 2) at a particular time. As shown in FIG. 2, at certain times t the traffic amount number Nt associated with that time t is not less than a traffic limit number, designated as Nm. During periods of time when the amount of traffic reaches the traffic limit, as shown by the shaded region in FIG. 2, the reliability of a conventional broadcast data transmission system may be degraded.

Each station 11 in the LAN receives and stores broadcast data in its internal buffer 13 and needs time to process the stored broadcast data. As the amount of broadcast data sent on transmission line 12 during a time period increases, it becomes more difficult for the stations to process the received broadcast data. If broadcast data is received without any flow control on the traffic amount, at some point the traffic amount will be so heavy that the maximum amount of data that can be processed in the internal buffers of each station 11 will be exceeded.

When processing by a station cannot keep up with rate at which new broadcast data is being received and stored, the internal buffer for that station will remain in a busy state. If its internal uffer 13 remains busy, station 11 will not be able to receive additional broadcast data on the transmission line. Therefore, some flow control on the traffic is needed. However, in a broadcast data transmission system, the sending station essentially requires no answer or acknowledgement from the receiving stations, thereby preventing the sending station from determining whether the internal buffers in the receiving stations are busy. Consequently, it is extremely difficult to provide a broadcast data transmission system in which sending stations can exercise data flow control over the sending of broadcast data on the transmission line.

Therefore, in order to improve the reliability and efficiency of data transmission in broadcast data transmission systems, there is a need for data flow control by the sending stations in such systems.

SUMMARY OF THE INVENTION

It is an object of the invention to overcome some of the problems and disadvantages of the prior art.

It is therefore desirable to provide apparatus and methods for data flow control by sending stations in broadcast data transmission systems.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied broadly described herein, a broadcast data transmission station for use in a data transmission system is provided, the data transmission system including a number of broadcast data transmission stations connected to a transmission line for transmitting broadcast. The broadcast data transmission station of this invention includes traffic amount computation means, to be coupled to the transmission line, for computing a traffic amount number corresponding to the amount of broadcast data present on the transmission line during a unit time period associated with a particular time. Initial attempt means, coupled to the traffic amount computation means, is provided for comparing the traffic amount number associated with an initial time with a traffic limit number to determine whether broadcast data can be sent on the transmission line during an initial attempt at the initial time. Subsequent attempt means, coupled to the traffic amount computation means, is also provided for waiting a delay time and comparing the traffic amount number associated with a subsequent time with the traffic limit number, to determine whether broadcast data can be sent on the transmission line during a subsequent attempt at times when the traffic amount number associated with the initial time is not less than the traffic limit number. The station includes transmission execution means, coupled to the initial and subsequent attempt means and to be coupled to the transmission line, for sending broadcast data on the transmission line at times when the traffic amount number is less than the traffic limit number. Additionally, the station is provided with transmission attempt computation means for computing the number of attempts to send broadcast data; comparator means, coupled to the transmission attempt computation means, for comparing the number of attempts to send broadcast data with a transmission attempts limit number; and suspension means, coupled to the comparator means, for suspending further attempts to send broadcast data on the transmission line when the number of attempts is not less than the transmission attempts limit number.

According to another aspect of the present invention, a method of transmitting broadcast data from a broadcast data transmission station on a transmission line connected to a number of stations included in a data transmission system is provided. The method performed by the broadcast data transmission station comprises the steps of: computing a traffic amount number corresponding to the amount of broadcast data present on the transmission line during a unit time period associated with a particular time; comparing the traffic amount number associated with an initial time with a traffic limit number to determine whether broadcast data can be sent on the transmission line during an initial attempt at the initial time; waiting a delay time and comparing the traffic amount number associated with a subsequent time with the traffic limit number, to determine whether broadcast data can be sent on the transmission line during a subsequent attempt at times when the traffic amount number associated with the initial time is not less than the traffic limit number; sending broadcast data on the transmission line at times when the traffic amount number is less than the traffic limit number; computing the number of attempts to send broadcast data; comparing the number of attempts to send broadcast data with a transmission attempts limit number; and suspending further attempts to send broadcast data on the transmission line when the number of attempts is not less than the transmission attempts limit number.

The accompanying drawings, which are incorporated in and constitute a part of this specification, illustrate a preferred embodiment of the invention, and together with the description, serve to explain the principles of the invention.

DESCRIPTION OF THE PREFERRED EMBODIMENTS

Reference will now be made in detail to the present preferred embodiments of the invnetion, an example of which is iluustrated in the accompanying drawings.

Figure 1:
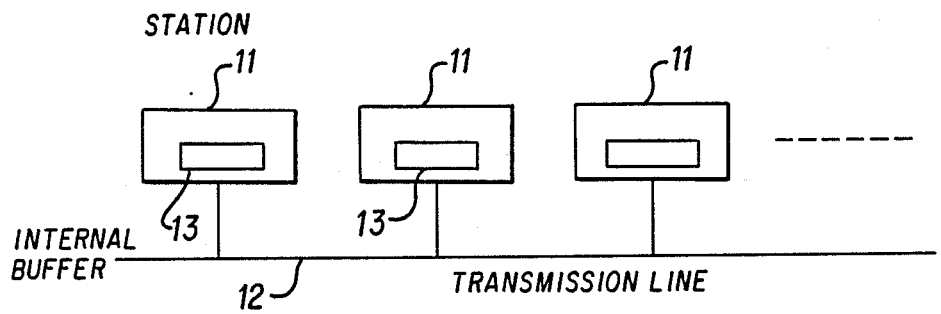
FIG. 1 is a block diagram of a broadcast data transmission system.

The broadcast data transmission station of the present invention is used in a data transmission system including a number of stations connected to a transmission line. FIG. 1 is a block diagram showing a LAN in which a broadcast data tranmission station can be used. A number of stations 11 are connected to transmission line 12 of the LAN for transmitting data.

Figure 3:
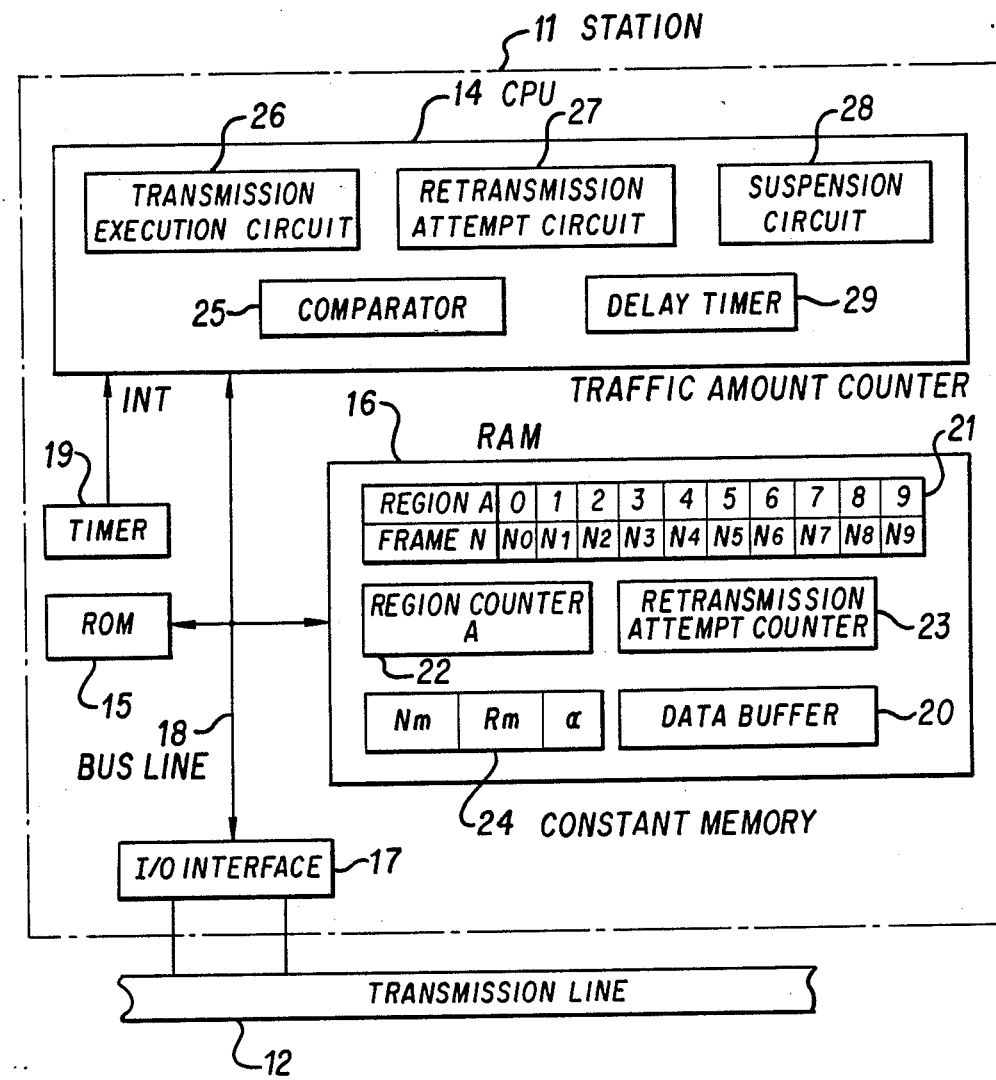
FIG. 3 is a block diagram of a broadcast data transmission station constructed in accordance with the present invention.

A preferred embodiment of broadcast data transmission station 11 is shown in FIG. 3. The station includes a CPU (central processing unit) 14 that executes instructions and performs various data processing operations, a ROM 15 for storing control programs, a RAM 16 for storing data to be transmitted or received, such as broadcast data, an I/O interface 17 for transmitting and receiving data on transmission line 12 of the LAN, and a bus line 18 that mutually connects these internal components of station 11. An interrupt signal INT having a sampling time period dT is provided to CPU 14 by a timer 19. As embodied herein, the sampling time period of the interrupt signal is 100 milliseconds. RAM 16 includes a data buffer 20 for storing and assembling in transmission frames broadcast data to be transmitted or received.

In accordance with the present invention, there is provided traffic amount computation means, to be coupled to the transmission line, for computing a traffic amount number corresponding to the amount of broadcast data present on the transmission line during a unit time period associated with a particular time. In a preferred embodiment, the traffic amount computation means includes a traffic amount counter 21 and a region counter 22 in RAM 16. The traffic amount counter computes the traffic amount number Nt corresponding to the amount of broadcast data present on the transmission line during a unit time period T. In this example, the unit time period has a duration of 1.0 second.

The traffic amount computation means may include a number of regions for storing a number of partial traffic amount numbers corresponding to the amount of broadcast data present on the transmission line during a sampling time period shorter than the unit time period. As embodied herein, traffic amount counter 21 of RAM 16 contains ten regions. Each of these regions respectively provided with a region designation A, which is a number ranging in value from zero to nine. For each region A, a partial traffic amount number Na corresponding to the amount of broadcast data present on the transmission line during a sampling time period dT is computed. By summing partial traffic amount numbers Na for a number of regions A, the traffic amount number Nt corresponding to the unit time period T is obtained. In this example, the unit time period T is 1.0 second and the sampling time period dT is 100 milliseconds. Accordingly, the traffic amount number Nt is computed by summing ten partial traffic amount numbers Na corresponding to ten consecutive sampling time periods dT. Region counter 22 is provided for identifying the region A for which a partial traffic amount number Na is being computed. If the region designation A after incrementing by region counter 22 exceeds nine in the embodiment of FIG. 3, the region designation A is resest to an initial value of zero.

Figure 4:
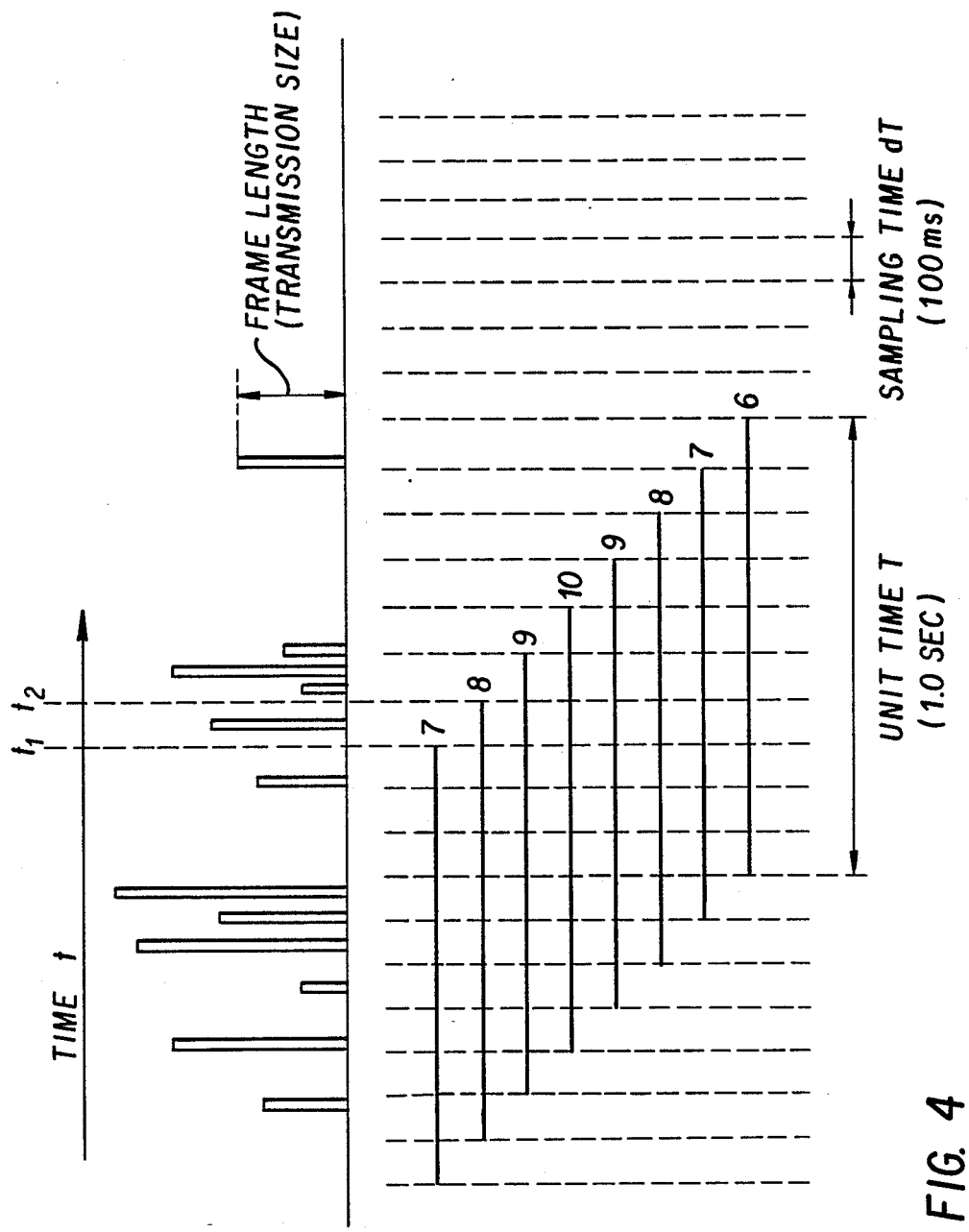
FIG. 4 is a diagram showing the time variation of the traffic amount number corresponding to the amount of broadcast data present on a transmission line during a unit time period.

In one preferred embodiment of the invention, the traffic amount number Nt is defined as the number of transmission frames received by the station during one unit time period that contain broadcast data. As shown in FIG. 4, the traffic amount number Nt associated with an arbitrary time t is computed by counting the number of separate transmission frames containing broadcast data that are present on transmission line 12 during the unit time period T preceding the arbitrary time t. For example, the traffic amount number Nt associated with the time t1 is seven because seven transmission frames were counted during the corresponding unit time period T, while the traffic amount number Nt associated with time t2 is eight because of an additional transmission frame that was sent on transmission line 12 during a samling time dT that was not included in the unit time T corresponding to time t1.

In another preferred embodiment of the invention, the traffic amount number Nt is defined as also requiring computation of the amount of broadcast data in each separate transmission frame received by the station during one unit time period. As shown in FIG. 4, the length of the transmission frames on transmission line 12 is variable and depends on the amount of broadcast data in the frame that is being transmitted. Therefore, the traffic amount number Nt associated with an arbitrary time t can be computed by counting both the number of transmission frames and the amount of broadcast data in each transmission frame present on transmission line 12 during the unit time period T preceding the arbitrary time t.

The invention includes transmission attempt computation means for computing the number of attempts to send broadcast data. Preferably, the transmission attempt computation means is provided by a retransmission attempt counter 23 in RAM 16. Retransmission attempt counter 23 computes the number of attempts R by counting the number of times during which an attempt is made to send the same broadcast data on the transmission line but during which the broadcast data cannot be sent because data buffer 20 is in or is approaching a busy state. Data buffer 20 is in a busy state at time when the traffic amount number Nt is relatively high.

In the broadcast data transmission station of the present invention, initial attempt means is coupled to the traffic amount computation means, and compares the traffic amount number associated with an initial time with a traffic limit number to determine whether broadcast data can be sent on the transmission line during an initial attempt at the initial time. As embodied herein, the initial attempt means includs a constant memory 24 in RAM 16 and a comparator 25 in CPU 14. Constant memory 24 stores the traffic limit number Nm. The traffic limit number Nm is typically set to a value that is approximately 80 to 90% of maximum traffic capacity. When the traffic on transmission line 12 is so heavy that the maximum amount of data that can be processed in data buffer 20 of station 11 is reached, station 11 is unable to accept additional broadcast data and the data transmission system is operatin at maximum traffic capacity. In the CPU, comparator 25 compares traffic limit number Nm stored in constant memory 24 with the traffic amount number Nt computed by traffic amount counter 21 and determines whether the traffic amount number is less than the traffic limit number, which indicates that broadcast data cam be sent on the transmission line.

The invention includes transmission execution means, coupled to the initial and a subsequent attempt means and to be coupled to the transmission line, for sending broadcast data on the transmission line at times when the traffic amount number is less than the traffic limit number. Preferably, the tranmission execution means is provided by a transmission execution circuit 26 in CPU 14. Transmission execution circuit 26 is responsive to the results of a comparison of the traffic amount number and the traffic limit number performed by comparator 25, and allows broadcast data to be sent by station 11 to transmission line 12 through I/O interface 17 at times when traffic on line 12 is not very heavy (i.e., Nt is less than Nm).

In accordance with the present invention, there is provided a subsequent attempt means, coupled to the traffic amount computation means, for waiting a delay time and comparing the traffic amount number associated with a subsequent time with the traffic limit number, to determine whether broadcast data can be sent on the transmission line during a subsequent attempt at times when the traffic amount number associated with the initial time is not less than the traffic limit number. In a preferred embodiment, the subsequent attempt means includes a retransmission attempt circuit 27 and a delay timer 29 in CPU 14, constant memory 24, and comparator 25. Whenever comparator 25 indicates the traffic amount number Nt associated with a particular time t1 is not less than Nm, a delay time Td is calculated by delay timer 29. After waiting for the delay tim Td, retransmission attempt circuit 27 commands comparator 25 to compare the traffic limit number Nm stored in constant memory 24 with a new traffic amount number Nt computed by traffic amount counter 21 that is associated with a subsequent time t2.

A preferred embodiment of the subsequent attempt means may include delay timer means for computing the delay time to be dependent on the difference between the traffic amount number and the traffic limit number. The delay time means is embodied herein by delay timer 29 and constant memory 24. Constant memory 24 stores the traffic limit number and a constant $\alpha$, which is used to compute the delay time Td.

In the invention, the broadcast data transmission station is provided with comparator means, coupled to the transmission attempt computation means, for comparing the number of attempts to send broadcast data with a transmission attempts limit number. As embodied herein, the comparator means includes comparator 25 and constant memory 24. Whenever an attempt is made to send broadcast data but the traffic amount number is not less than the traffic limit number, retransmission attempt counter 23 increments the number of attempts R. Comparator 25 compares the new number of attempts R provided by retransmission attempt counter 23 with a transmission attempt limit number Rm stored in constant memory 24. Comparator 25 indicates whether the number of attempts R is not less than Rm.

The invention includes suspension means, coupled to the comparator means, for suspending further attempts to send broadcast data on the transmission line when the number of attempts is not less than the transmission attempts limit number. In a preferred embodiment, the suspension means is provided by a suspension circuit 28 in CPU 14. Suspension circuit 28 prevents the sending of broadcast data by station 11 on transmission line 12 when a predetermined number of unsuccessful attempts to send that same broadcast data have already been made. Whenever comparator 25 indicates the number of attempts R to send the broadcast data is not less than the transmission limit number Rm, no more attempts at sending that broadcast data will be made by retransmission attempt circuit 27 and transmission execution circuit 26 will not allow that broadcast data to be sent to transmission line 12 through I/O interface 17.

Figure 5:
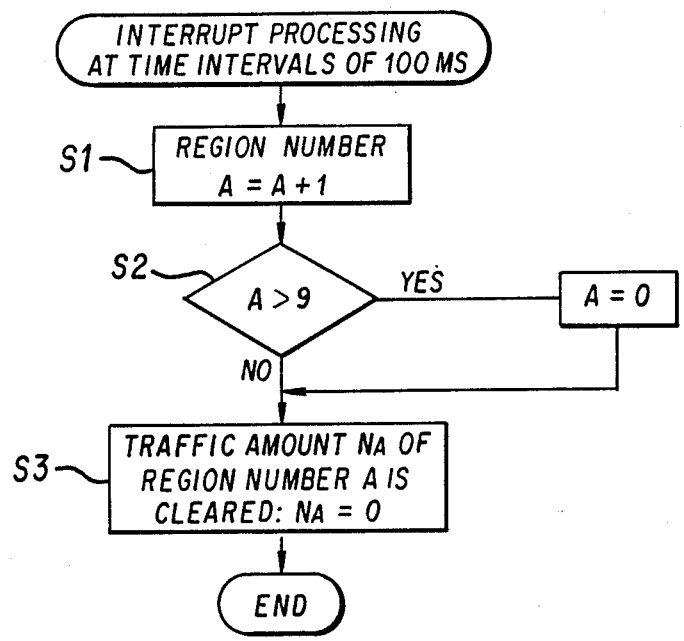
FIGS. 5, 6, and 7 are flow charts illustrating the steps performed by a broadcast data transmission station constructed in accordance with the present invention.

CPU 14 is programmed to execute interrupt processing as shown in the flow chart of FIG. 5. An interrupt signal INT having a sample time period dT of 100 milliseconds is provided by timer 19. Each time an interrupt signal IN is provided, region designation A generated by region counter 22 is incremented by one during step S1. In step S2, if region designation A after incrementing exceeds a maximum value of nine in this example, region designation A is reset to the initial value of zero. Next, in step S3 the partial traffic amount Na for the region corresponding to region designation A is cleared (i.e., Na is set equal to zero).

Figure 6:
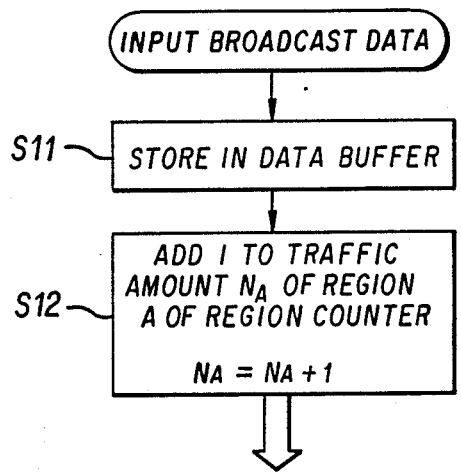

FIG. 6 is a flow chart showing operation of CPU 14 in response to receipt of broadcast data by station 11. Broadcast data can be received by station 11 either when a transmission frame containing broadcast data is sent from another station on transmission line 12 through I/O interface 17 to station 11, or when a transmission frame containing broadcast data is sent to transmission line 12 by station 11 itself. In step S11, when a transmission frame is received, it is stored in data buffer 20 of RAM 16. In step S12, the partial traffic amount number Na for the region corresponding to region designation A (provided by region counter 22) is incremented by one.

Figure 7:
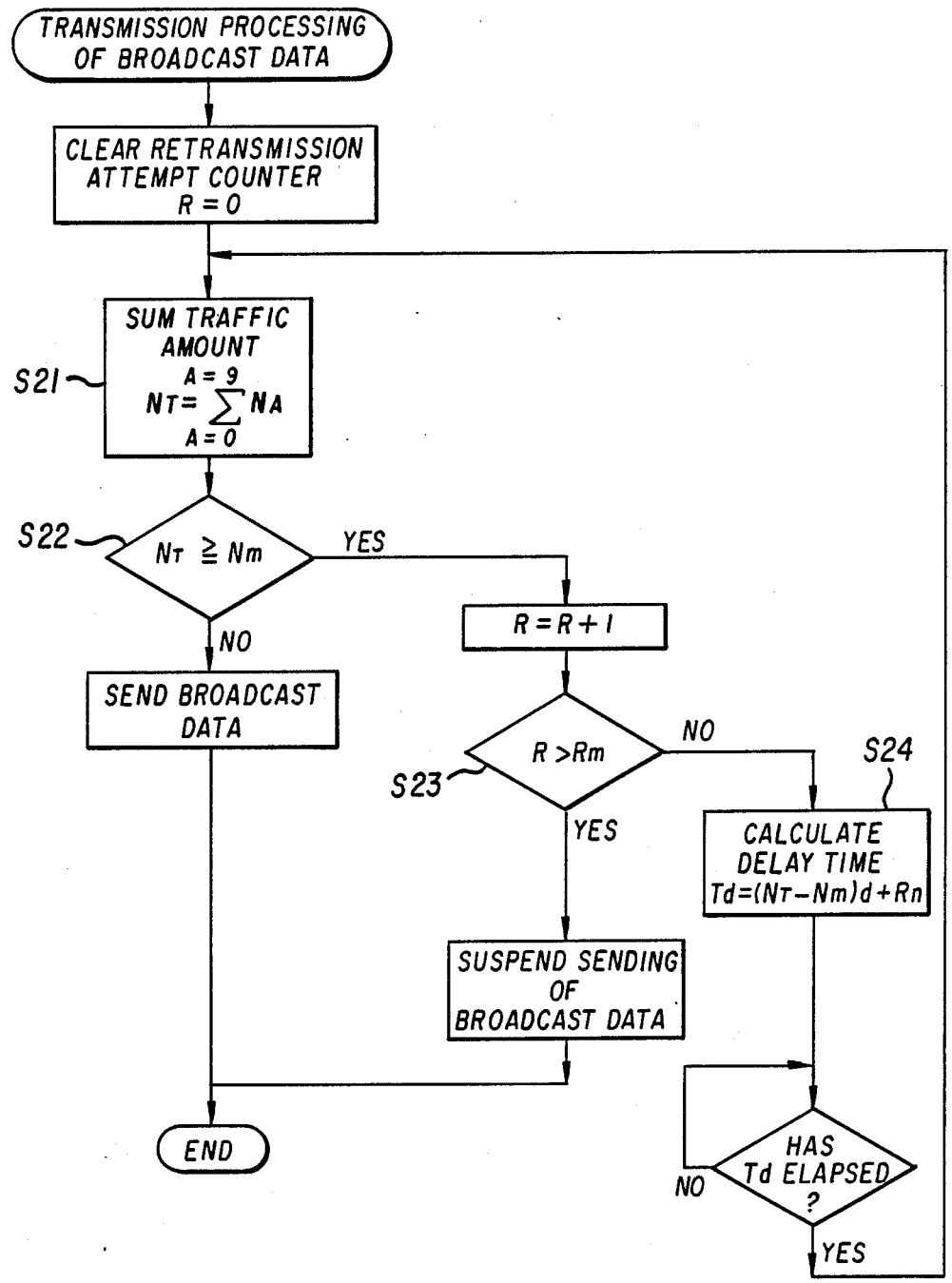

The transmission processing required to send broadcast data out from station 11 is executed by CPU 14 in accordance with the flow chart shown in FIG. 7. First, the number of attempts R by station 11 to send the broadcast data, which is computed by retransmission attempt counter 23, is cleared to the initial value of zero. In step S21, the traffic amount number Nt is computed by summing all of the partial traffic amount numbers Na corresponding to ten consecutive sampling time periods and stored in the ten regions of traffic amount counter 21. In step S22, the traffic amount number Nt is compared with the traffic limit number Nm set in constant memory 24. Unless the traffic amount number Nt is greater than or equal to the traffic limit number Nm, the broadcast data is assembled in a transmission frame and sent to transmission line 12 through I/O interface 17 using transmission execution circuit 26.

If the traffic amount number Nt is not less than the traffic limit number Nm in step S22, the number of transmission attempts R is incremented by one by retransmission attempt counter 23. In step S23, unless the number of transmission attempts R after incrementing has reached the transmission attempts limit number Rm stored in constant memory 24, processing to calculate the delay time Td is performed next in step S24. However, if in step S23 the number R of transmission attempts reaches Rm, attempts to transmit the broadcast data are suspended.

In step S24, the delay time Td is computed using a random marginal delay Rn, a constant $\alpha$ stored in constant memory 24, and the difference between the traffic limit number Nm stored in constant memory 24 and the traffic amount number Nt. The preferred equation for calculating the delay time is $Td = \alpha \times (Nt - Nm) + Rn$. Thus, the delay time is continually varied. After the calculated delay time Td has been computed and has elapsed, CPU 14 computes Nt again for a different time t, as shown in the branching back to step S21. In this embodiment, random marginal delay Rn is added to the delay time Td in order to more widely distribute the timing of retransmission attempts by the stations. As a result, the height of any peaks in the traffic amount number Nt will probably be reduced.

As shown in FIG. 4, the traffic amount number Nt is a moving average. During each sampling time period dT, the unit time period T to which the traffic amount number computed by traffic amount counter 21 corresponds shifts by 100 milliseconds in a preferred embodiment. Consequently, the amount of broadcast data being sent on transmission line 12 can be continually monitored.

The traffic limit number Nm is set to a value close to the maximum amount of broadcast data that can be processed in data buffer 20 of station 11. New broadcast data will not be sent when the traffic amount exceeds the limit Nm. If the stations differ in their ability to process broadcast data received in their respective data buffers, the traffic limit number Nm is set to an amount that can be processed by the station of lowest capacity. Traffic in excess of the limit Nm (for example, as shown by shaded region in FIG. 2) is delayed and not sent out until a later time when the amount of traffic is less than the limit Nm.

Figure 2:
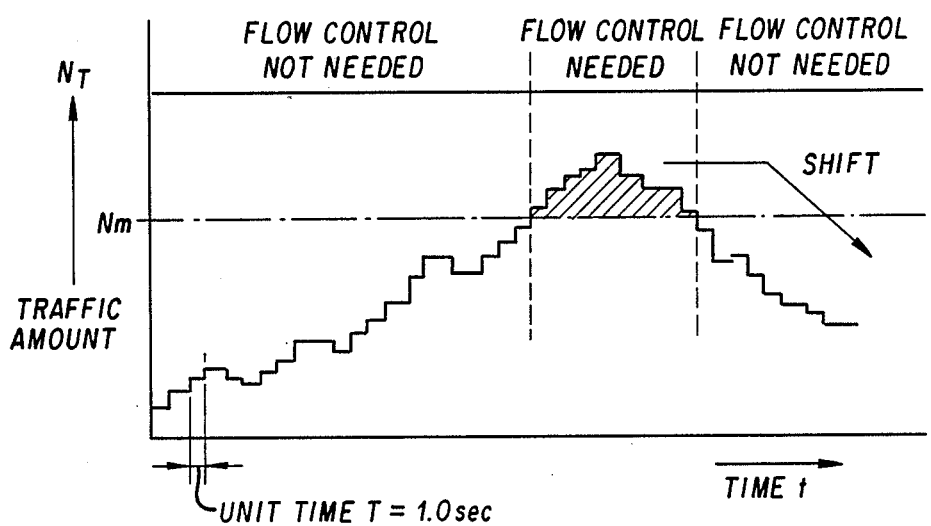
FIG. 2 is a diagram showing the time variation of the amount of traffic on a transmission line.

The use of traffic limit number Nm in determining whether to send broadcast data on transmission line 12 provides a safety margin for reception of broadcast data by the stations in a broadcast data transmission system. The probability of errors in data transmission is reduced in comparison with a system in which broadcast data is not subject to any flow control and in which the traffic amount is not computed, as shown in FIG. 2. Accordingly, the broadcast data transmission system of the present invention results in increased reliability of data transmission.

It will be apparent to those skilled in the art that various modifications and variations can be made in the method and apparatus for data flow control in broadcast data transmission systems provided by the present invention without departing from the scope or spirit of the invention. Thus, it is intended that the present invention cover the modifications and variations of this invention provided they come within the scope of the appended claims and their equivalents.

What is claimed is:

1. A broadcast data transmission station for use in a data transmission system, the data transmission system including a plurality of broadcast data transmission stations connected to a transmission line for transmitting broadcast data, wherein the broadcast data transmission station comprises:

traffic amount computation means, to be coupled to the transmission line, for computing a traffic amount number corresponding to the amount of broadcast data present on the transmission line during a unit time period associated with a particular time;

initial attempt means, coupled to the traffic amount computation means, for comparing the traffic amount number associated with an initial time with a traffic limit number to determine whether broadcast data can be sent on the transmission line during an initial attempt at the initial time;

subsequent attempt means, coupled to the traffic amount computation means, for waiting a delay time and comparing the traffic amount number associated with a subsequent time with the traffic limit number, to determine whether broadcast data can be sent on the transmission line during a subsequent attempt at times when the traffic amount number associated with the initial time is not less than the traffic limit number;

transmission execution means, coupled to the initial and subsequent attempt means and to be coupled to the transmission line, for sending broadcast data on the transmission line at times when the traffic amount is less than the traffic limit number;

transmission attempt computation means, coupled to the transmission execution means, for computing the number to attempts to send broadcast data;

comparator means, coupled the transmission attempt computation means, for comparing the number of attempts to send broadcast data with a transmission attempts limit number; and suspension means, coupled to the comparator means and to the transmission execution means, for suspending further attempts to send broadcast data on the transmission line when the number of attempts is not less than the transmission attempts limit number.

2. A station in accordance with claim 1 wherein the subsequent attempt means includes delay timer means for computing the delay time to be dependent on the difference between the traffic amount number and the traffic limit number.

3. A station in accordance with claim 1 wherein the station includes memory means for storing the traffic limit number and the transmission attempts limit number.

4. A station in accordance with claim 1 wherein the trafic amount computation means includes a plurality of regions for storing a plurality of partial traffic amount numbers corresponding to the amount of broadcast data present on the transmission line during a sampling time period shorter than the unit time period.

5. A method of transmitting broadcast data from a broadcast data transmission station on a transmission line connected to a plurality of stations included in a data transmission system, wherein the method performed by the broadcast data transmission station comprises the steps of:

computing a traffic amount number corresponding to the amount of broadcast data present on the transmission line during a unit time period associated with a particular time;

comparing the traffic amount number associated with an initial time with a traffic limit number to determine whether broadcast data can be sent on the transmission line during an initial attempt at the initial time;

waiting a delay time and comparing the traffic amount number associated with a subsequent time with the traffic limit number, to determine whether broadcast data can be sent on the transmission line during a subsequent attempt at times when the traffic amount number associated with the intial time is not less than the traffic limit number;

sending broadcast data on the transmission line at times when the traffic amount number is less than the traffic limit number;

computing the number of attempts to send broadcast data;

comparing the number of attempts to send broadcast data with a transmission attempts limit number; and suspending further attempts to send broadcast data on the transmission line when the number of attempts is not less than the transmission attempts limit number.

6. The method in accordance with claim 5 wherein the step of waiting further comprises computing the delay time to be dependent on the difference between the traffic amount number and the traffic limit number.

* * * * *

UNITED STATES PATENT AND TRADEMARK OFFICE
CERTIFICATE OF CORRECTION

PATENT NO. : 4,912,703

DATED : March 27, 1990

INVENTOR(S) : Yuji Sumida

It is certified that error appears in the above-identified patent and that said Letters Patent is hereby corrected as shown below:

Claim 1, Col. 8, Line 65, "to" (1st Occurrence) should be --of--.

Claim 4, Col. 9, Line 19, "trafic" should be --traffic--.

Signed and Sealed this

Third Day of November, 1992

Attest:

DOUGLAS B. COMER

*Attesting Officer*     *Acting Commissioner of Patents and Trademarks*